US009553677B1

(12) United States Patent
Soh et al.

(10) Patent No.: US 9,553,677 B1
(45) Date of Patent: Jan. 24, 2017

(54) SELF-REFERENCED CONTINUOUS-VARIABLE QUANTUM KEY DISTRIBUTION

(71) Applicant: Sandia Corporation, Albuquerque, NM (US)

(72) Inventors: Daniel B. S. Soh, Pleasanton, CA (US); Mohan Sarovar, Albany, CA (US); Ryan Camacho, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/943,373

(22) Filed: Nov. 17, 2015

Related U.S. Application Data

(60) Provisional application No. 62/080,798, filed on Nov. 17, 2014.

(51) Int. Cl.
*H04B 10/64* (2013.01)

(52) U.S. Cl.
CPC .................................. *H04B 10/64* (2013.01)

(58) Field of Classification Search
CPC ..................................................... H04B 10/64
USPC ......................................................... 398/204
See application file for complete search history.

(56) References Cited

U.S. PATENT DOCUMENTS

| 7,512,338 | B2 * | 3/2009 | Shpantzer | H04B 10/25137 |
| | | | | 398/159 |
| 7,706,536 | B2 | 4/2010 | Dinu et al. | |
| 7,747,023 | B2 | 6/2010 | Bussieres et al. | |
| 7,929,700 | B2 | 4/2011 | Lodewyck et al. | |
| 8,683,192 | B2 | 3/2014 | Ayling et al. | |
| 8,792,791 | B2 | 7/2014 | Wiseman et al. | |
| 2005/0047601 | A1 * | 3/2005 | Shields | H04B 10/70 |
| | | | | 380/283 |
| 2009/0268901 | A1 * | 10/2009 | Lodewyck | H04L 9/0852 |
| | | | | 380/41 |
| 2010/0189445 | A1 * | 7/2010 | Nakashima | H04B 10/60 |
| | | | | 398/152 |
| 2010/0329697 | A1 * | 12/2010 | Koizumi | H03J 7/26 |
| | | | | 398/208 |
| 2013/0209089 | A1 * | 8/2013 | Harley | H04B 10/5561 |
| | | | | 398/25 |
| 2015/0171895 | A1 * | 6/2015 | Pfau | G06F 11/10 |
| | | | | 714/776 |

(Continued)

OTHER PUBLICATIONS

Grosshans, et al., "Continuous-Variable Quantum Key Distribution", Quantum Information With Continuous Variables of Atoms and Light, Dec. 31, 2005, pp. 1-20.

*Primary Examiner* — Dalzid Singh
(74) *Attorney, Agent, or Firm* — Medley, Behrens & Lewis, LLC

(57) ABSTRACT

Various technologies for continuous-variable quantum key distribution without transmitting a transmitter's local oscillator are described herein. A receiver on an optical transmission channel uses an oscillator signal generated by a light source at the receiver's location to perform interferometric detection on received signals. An optical reference pulse is sent by the transmitter on the transmission channel and the receiver computes a phase offset of the transmission based on quadrature measurements of the reference pulse. The receiver can then compensate for the phase offset between the transmitter's reference and the receiver's reference when measuring quadratures of received data pulses.

20 Claims, 7 Drawing Sheets

(56) References Cited

U.S. PATENT DOCUMENTS

2015/0236795 A1\* 8/2015 Malouin ............ H04B 10/6161
398/65

\* cited by examiner

SELF-REFERENCED CONTINUOUS-VARIABLE QUANTUM KEY DISTRIBUTION

RELATED APPLICATION

This application claims priority to U.S. Provisional Patent Application No. 62/080,798, filed on Nov. 17, 2014, and entitled "QUADRATURE OPTICAL COMMUNICATION WITHOUT TRANSMITTING LOCAL OSCILLATOR", the entirety of which is incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Quantum key distribution (QKD) enables generation of secured shared randomness between two communicating parties, which facilitates secure communications between the parties. Continuous-variable quantum key distribution (CV-QKD) is a method of QKD that encodes data on phase and amplitude quadratures of a continuous optical signal. When communicating using CV-QKD, interferometric detection is used to measure the phase or amplitude quadratures of a received signal. Conventional CV-QKD systems rely on a transmitter transmitting a local oscillator signal at a power that is orders of magnitude higher than a power of the data signal to be measured; this power discrepancy improves performance of the aforementioned interferometric detection. When transmitting the local oscillator, the transmitter physically separates the local oscillator and data signal prior to encoding the data signal. Separation of the local oscillator and data signal is undertaken to avoid contamination of the low-power data signal by the high-power local oscillator.

SUMMARY

The following is a brief summary of subject matter that is described in greater detail herein. This summary is not intended to be limiting as to the scope of the claims.

Various technologies for enabling CV-QKD in optical communication without requiring a transmitter to transmit a local oscillator signal are described herein. In an example, the transmitter sends a reference pulse and a data pulse to a receiver over a transmission path. The receiver can analyze phase and amplitude quadratures of the reference pulse to determine a phase offset between signal measurements at the transmitter and signal measurements at the receiver. The receiver can then use the phase offset to align the receiver's measurement of amplitude and phase quadratures of the data pulse with the reference frame of the transmitter, permitting the receiver to decode information encoded on the amplitude and phase quadratures of the data pulse.

The above presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
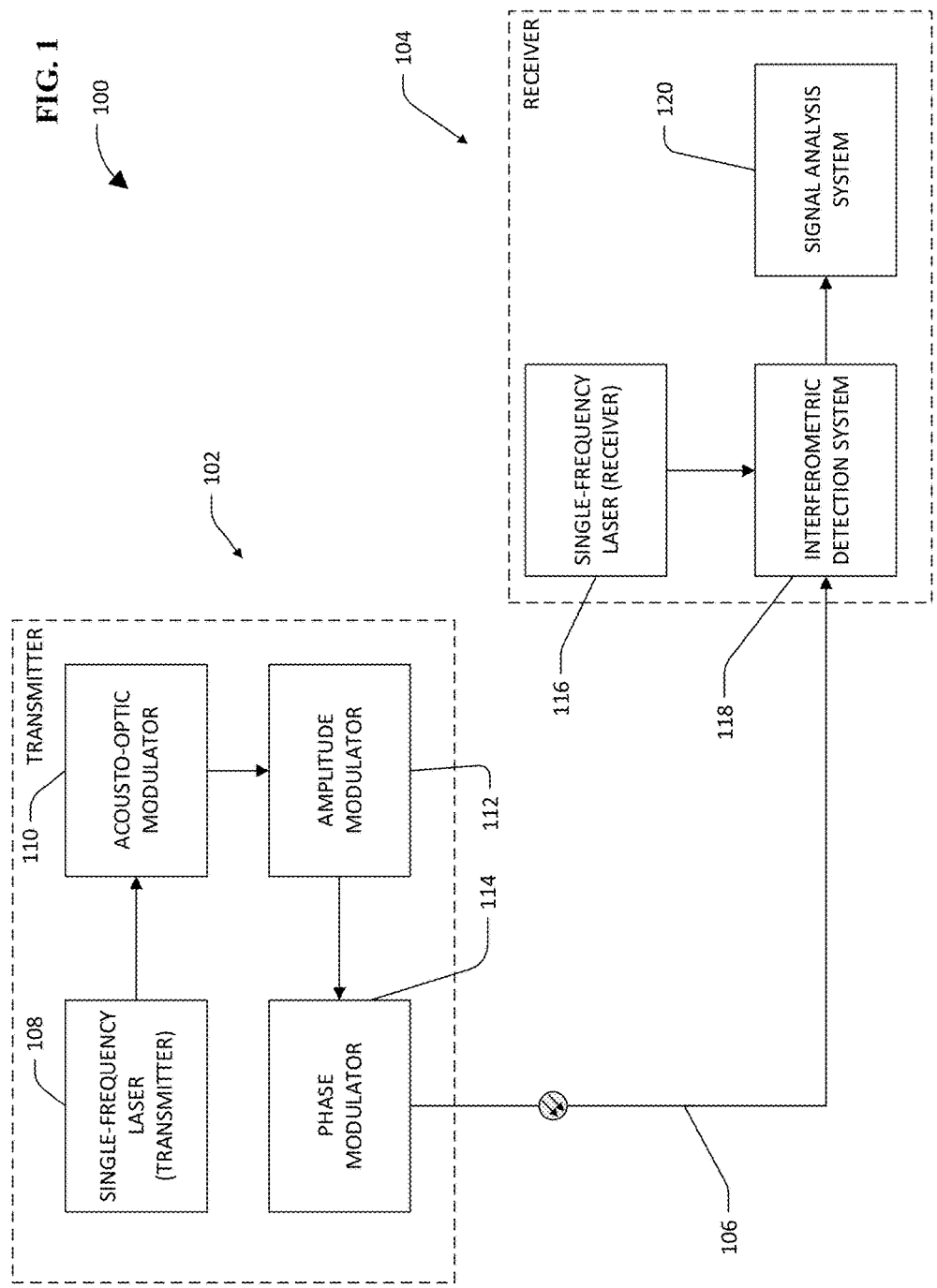
FIG. 1 is a functional block diagram of an exemplary system that facilitates performing CV-QKD.

Various technologies pertaining to CV-QKD are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

Additionally, the following detailed description of the figures makes use of conventional nomenclature to refer to two parties to secure communication as "Alice" and "Bob"

in order to facilitate understanding of certain concepts. These terms are not intended to indicate any limitation as to the nature or characteristics of parties to communication. Specifically, the use of the names Alice and Bob is not intended to imply action by a human operator. For example, actions described as being taken by either Alice or Bob may be actions taken by an automated electronic system, a computing device, or the like.

CV-QKD permits secure communication between two parties (Alice and Bob) by taking advantage of the uncertainty principle and the complementarity between phase and amplitude quadratures of a continuous optical signal. As a result of the complementarity between phase and amplitude quadratures, when an eavesdropper is present on a communications channel and measures either the amplitude quadrature or the phase quadrature of the signal, information encoded on the other complementary quadrature is altered and corrupted. Thus, Alice and/or Bob can detect the presence of the eavesdropper on the communications channel when they compare a subset of data transmitted between them and notice a discrepancy. Physical characteristics or disturbances (e.g., path length, mechanical vibrations, temperature fluctuations, etc.) of an optical transmission path can introduce a phase shift in a transmitted signal. Thus, to be able to determine what the intended values of the amplitude and phase quadratures of the signal are, Bob must ensure that his own quadrature measurements match the transmitter's frame of reference.

To accomplish this, conventional CV-QKD systems require that a transmitter transmits its own local oscillator signal superimposed upon a data signal (encoded with some information) to provide a reference point for a receiver to use when measuring the quadratures of the optical data signal by interferometric detection (with the local oscillator as the interfering signal). The interferometric measurement results in phase and amplitude quadrature measurements that are referenced relative to the local oscillator (which the transmitter also uses as its reference). However, because precision of interferometric detection measurements depends on the relative power of two input signals, the transmitted oscillator signal must be high-power (e.g., 1 mW) relative to the low-power (e.g., 10 pW) data signal to allow for precise measurement of the data signal's quadrature values.

As a result of the power difference between the transmitter's oscillator signal and the encoded data signal, sending the local oscillator signal of the transmitter requires physical separation of the local oscillator signal and the data signal using a series of splitters and time-delay components (which are difficult to implement in integrated circuits) prior to encoding information on the data signal. Separating the local oscillator and data signal prior to encoding information on the data signal permits phase and amplitude modulation components to encode data on the data signal without introducing noise and interference from the high-power local oscillator signal. The oscillator signal and encoded data signal are then recombined (at the transmitter) with additional splitter components prior to transmission. The physical separation and recombination of the two signals introduces some phase ambiguity between the two signals, because they are transmitted over different physical paths. Various external interferences, including thermal fluctuations and mechanical vibrations change lengths of the different optical paths. This in turn makes phases of the oscillator signal and the encoded data signal randomly fluctuate. Once the oscillator signal and the encoded data signal are physically separated on different optical paths, such random phase fluctuation makes a relative phase between the oscillator signal and the encoded data signal ambiguous to an extent where Bob can no longer extract encoded phase information from interferometric measurement. The high-power transmitted oscillator signal can also interfere with the data signal on the transmission path as a result of scattering and other non-linear noise.

With reference to FIG. 1, an exemplary system 100 that facilitates CV-QKD is illustrated. As will be described in greater detail below, during operation, a local oscillator need not be transmitted while benefits of CV-QKD are retained. The system 100 includes a transmitter 102 and a receiver 104, which are in communication with one another by way of an optical transmission path 106. The transmitter 102 comprises a single-frequency laser 108 that is configured to emit light at a certain frequency. The transmitter 102 further comprises an acousto-optic modulator (AOM) 110 that receives the light from the single frequency laser 108 and outputs a pulsed optical signal. The transmitter 102 also includes an electro-optic (EO) amplitude modulator 112 that receives the pulsed optical signal from the AOM 110 and modifies the amplitude of the pulsed optical signal, thereby generating an amplitude-modulated pulsed optical signal. The transmitter 102 further comprises an EO phase modulator 114 that receives the amplitude-modulated pulsed optical signal from the EO amplitude modulator 112 and modifies the signal's phase to form a phase-shifted signal, whereupon the EO phase modulator 114 transmits the phase-shifted signal on the transmission path 106.

The receiver 104 comprises a single-frequency laser 116 configured to emit light at a certain frequency (e.g., the same frequency as the light emitted by the single-frequency laser 108 at the transmitter 102). The receiver 104 further comprises an interferometric detection system 118 that receives the phase-shifted signal from the transmitter 102 via the transmission path 106 and the light emitted from the single-frequency laser 116. As will be described in further detail below, the interferometric detection system measures phase and amplitude quadratures of the phase-shifted signal from the transmitter 102 based upon the phase-shifted signal and the light emitted from the single-frequency laser 116. In an example, the interferometric measurement can be performed through heterodyne or homodyne measurements. The receiver 104 also comprises a signal analysis system 120 that receives the quadrature measurements of signals from the interferometric detection system 118 and determines certain signal parameters based on the quadrature measurements. In an example, the transmitter and the receiver 104 can be integrated circuits with components 108-114 and 116-120, respectively, implemented on-chip.

The exemplary system 100 enables secure communication between the transmitter 102 and the receiver 104 over the transmission channel 106 without requiring the transmitter 102 to transmit a local oscillator to the receiver 104. Briefly, this is accomplished by using a pulsed reference signal to identify phase offset between the reference signal as sent by the transmitter 102 and as received by the receiver 104.

Operation of the system 100 is now set forth. At the transmitter 102, the single-frequency laser 108 generates a beam of coherent light, which is received by the acousto-optic modulator 110. The acousto-optic modulator 110 generates individual pulses on that light, and emits a pulsed signal. The amplitude modulator 112 amplitude-modulates pulses in the pulsed signal in response to an electrical control input (e.g., emitted from a clock (not shown), and outputs an amplitude-modulated signal. The phase modulator 114 phase-modulates the pulses in the amplitude-modulated signal in response to another electrical control input (e.g., from the clock or based upon a clock signal), and emits a modulated signal (which comprises pulses modulated in both amplitude and phase quadratures). The transmitter 102 transmits the modulated signal along the transmission channel 106 to the receiver 104. The modulated signal includes two kinds of pulses, separated in time: data pulses and reference pulses. Alice encodes data pulses on the phase and amplitude quadratures with some information that Alice wishes to communicate to Bob by varying electrical control inputs of the amplitude modulator 112 and the phase modulator 114 to cause the modulators 112-114 to modulate the optical signal. Alice likewise encodes reference pulses with fixed phase and amplitude values to allow Bob to align his measurement reference frame with Alice's reference frame.

The receiver 104 receives the modulated signal (which includes the two kinds of pulses) via the transmission channel 106. The single-frequency laser 116 emits an optical signal that can have the same frequency as the optical signal emitted by the single-frequency laser 108 at the transmitter 102. Alternatively, the single-frequency laser 116 can emit an optical signal with a different frequency when compared to the frequency of the optical signal emitted by the single-frequency laser 108 at the transmitter. The interferometric detection system 118 receives the modulated signal (including the reference and data pulses) as well as the optical signal from the single-frequency laser 116. The interferometric detection system 118 measures values of the phase and amplitude quadratures of reference pulses and data signals from the transmitter 102 using homodyne or heterodyne detection, using the optical signal emitted by the single-frequency laser 116 as a receiver-side local oscillator signal. That is, the interferometric detection system 118 uses the optical signal from the single-frequency laser 116 as an interfering signal. In the exemplary system 100, the interferometric detection system 118 can be an integrated circuit comprising a fiber coupler and photodiodes configured to perform homodyne or heterodyne detection between two signals. In an example, the interferometric detection system 118 first measures the phase and amplitude quadrature values of the reference pulse, and outputs phase and amplitude quadrature measurements for the reference pulse. The signal analysis system 120 then receives the measurements and computes a transmission offset phase by comparing the measurements to known quadrature values of the reference pulse transmission (e.g., based upon previously-agreed quadrature values of the reference pulse between Alice and Bob). In an example, the signal analysis system 120 can be an FPGA or ASIC configured to perform the computations described below. In another example, the signal analysis system 120 can be a computing device comprising a processor and memory configured with instructions that, when executed by the processor, cause the processor to perform the computations described below.

The signal analysis system 120 computes a transmission offset phase angle θ of the reference pulse according to the following formula:

$$\theta = \tan^{-1} \frac{p_{b_R} q_{a_R} - q_{b_R} p_{a_R}}{q_{b_R} q_{a_R} + p_{b_R} p_{a_R}} \qquad \text{Equation 1}$$

where p is the phase quadrature and q is the amplitude quadrature, with subscript a referring to quantities as measured by Alice at the transmitter 102, subscript b referring to quantities measured by Bob at the receiver 104, and subscript R indicating that the quantities refer to quadrature values of the reference signal. The transmitter-side quantities $p_{a_R}$ and $q_{a_R}$ are fixed by Alice and Bob a priori for the reference pulse, so the only remaining unknowns in the formula above prior to reception are $p_{b_R}$ and $q_{b_R}$. The measurement of phase and amplitude quadrature values at the receiver 104 is therefore sufficient for the signal analysis system 120 to compute the transmission phase offset angle θ.

Figure 2:
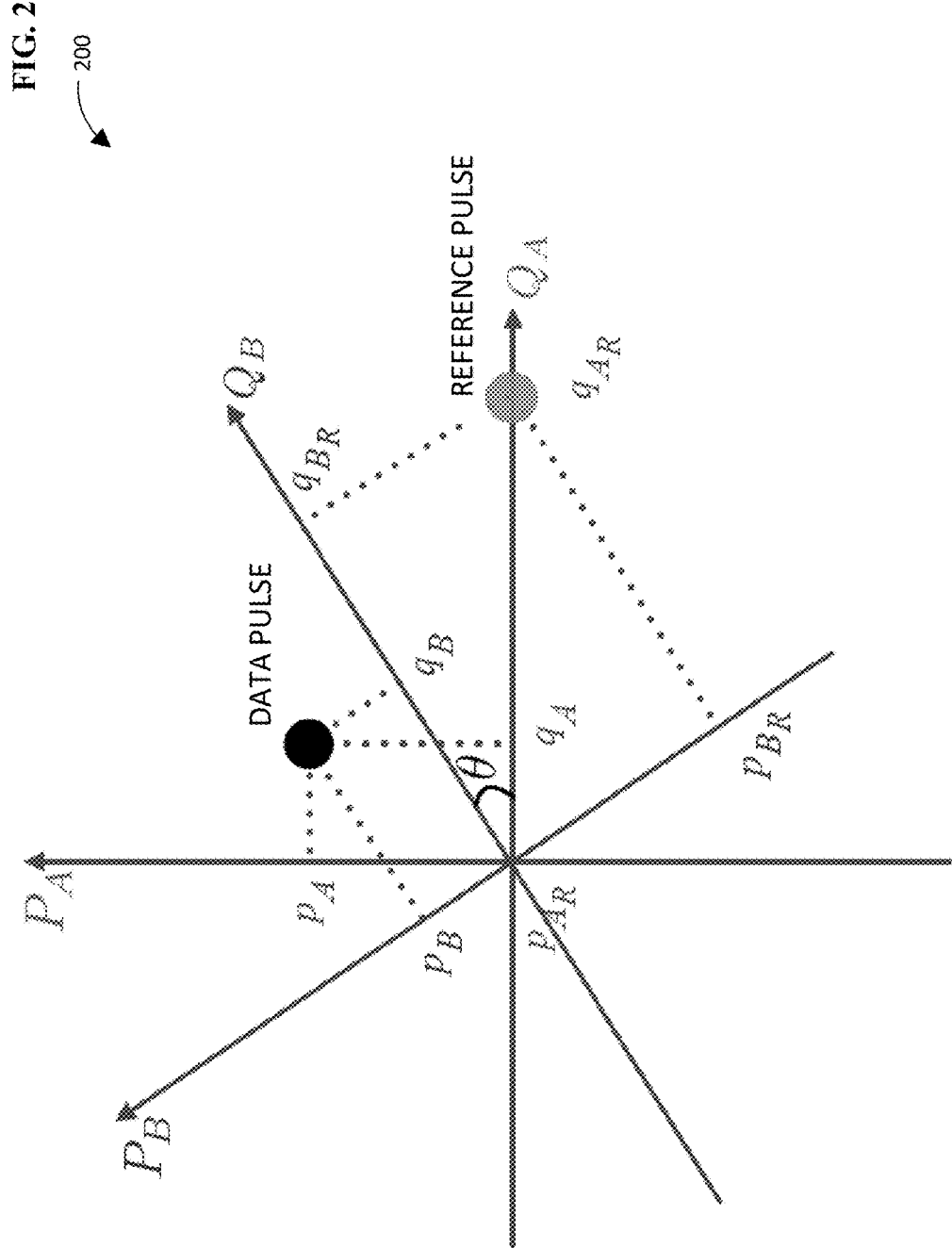
FIG. 2 is an exemplary illustration of misaligned quadrature reference frames of a transmitter and receiver.

Once the signal analysis system 120 computes the transmission phase offset angle, the signal analysis system 120 can use that phase angle θ in computations to compensate for phase drift in the channel 106 and output compensated phase and amplitude quadrature values of the data signal based upon values measured by the interferometric detection system 118 of the receiver 104. Referring now to FIG. 2, an illustration 200 of the effect of phase drift on measured phase and amplitude quadrature values is shown. Axes $P_A$ and $Q_A$ show Alice's reference frame while rotated axes $P_B$ and $Q_B$ show Bob's misaligned reference frame due to the transmission phase offset angle θ. Values $p_{a_R}$, $q_{a_R}$, $p_{b_R}$, and $q_{b_R}$ as shown in FIG. 2 are quadrature values of the reference pulse measured at the transmitter 102 and receiver 104 as described above with respect to Equation 1. Values $p_a$ and $q_a$ are the quadrature values of the data pulse as transmitted by the transmitter 102. The illustration 200 shows how misaligned reference frames caused by the phase offset θ result in values $p_b$ and $q_b$, the quadrature values measured at the receiver 104, being different from the values measured at the transmitter 102 for the same data pulse. Having computed the value of the angle θ from the reference pulse with known transmission quadrature values, the signal analysis system 120 can compute the phase and amplitude quadrature values of the data pulse as transmitted by Alice, $p_a$ and $q_a$, from the phase and amplitude quadrature values of the data pulse as measured by Bob, $p_b$ and $q_b$, by compensating for the misalignment of angle θ.

The transmitter 102 does not need to transmit a reference pulse each time a data pulse is transmitted, nor must a reference pulse immediately precede transmission of a data pulse. Reference pulses are only required to be transmitted at a rate substantially faster than the rate at which the transmission phase offset θ changes (e.g., an order of magnitude faster), so that the phase has not substantially changed by the time the receiver 104 receives a data pulse. Likewise, the single-frequency lasers 108 and 116 of the transmitter 102 and receiver 104, respectively, can exhibit some frequency drift with respect to each other. The system 100 is robust to the frequency drift between the lasers 108 and 116, and it is accounted for by the signal analysis system 120 like the channel phase drift described above, provided that the rate of drift is similarly small relative to the frequency of reference pulse transmissions. Furthermore, the receiver 104 need not receive a reference pulse before receiving a data pulse. In an example, the receiver 104 receives and measures the quadrature values of multiple data pulses prior to receiving a reference pulse, then computes compensated quadrature values of the data pulses after computing the phase offset angle θ based on the reference pulse.

Figure 3:
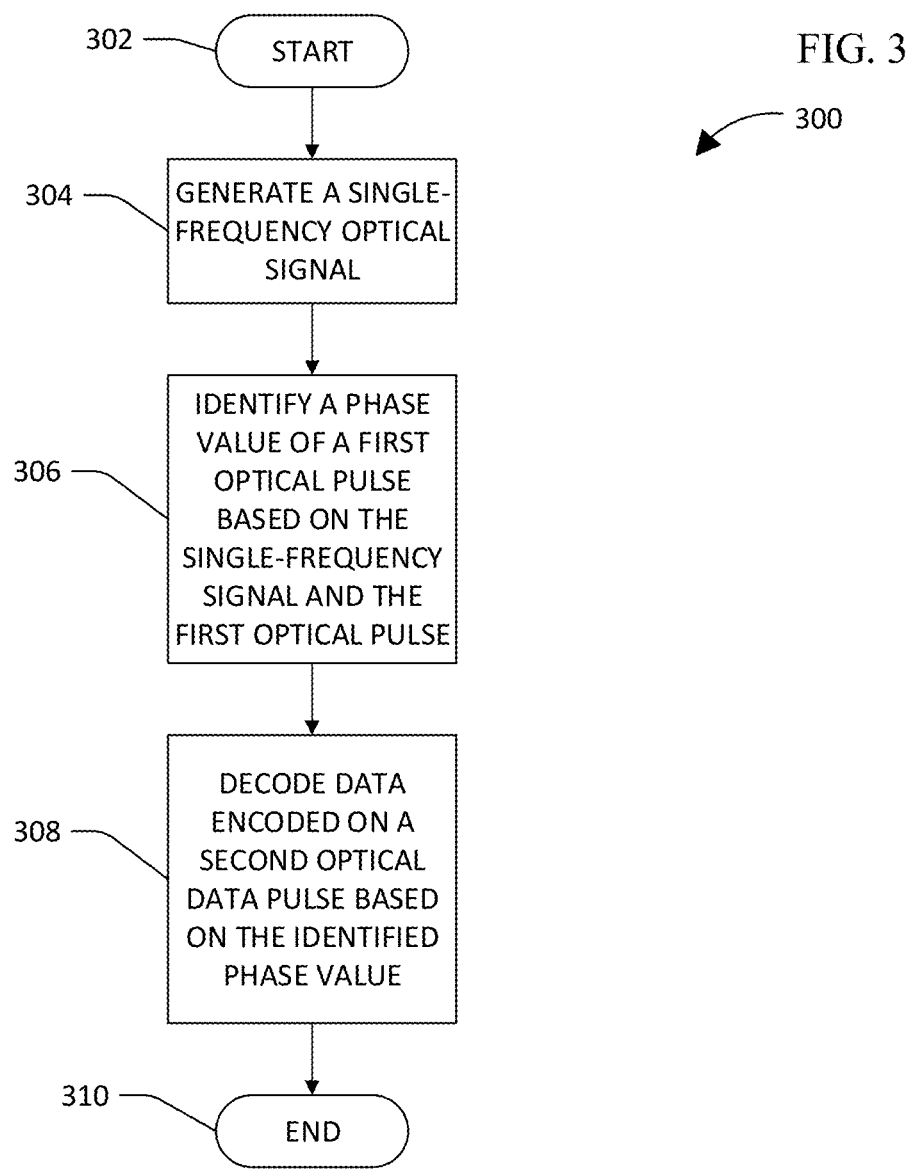
FIG. 3 is a flow diagram illustrating an exemplary methodology for performing CV-QKD.
Figure 4:
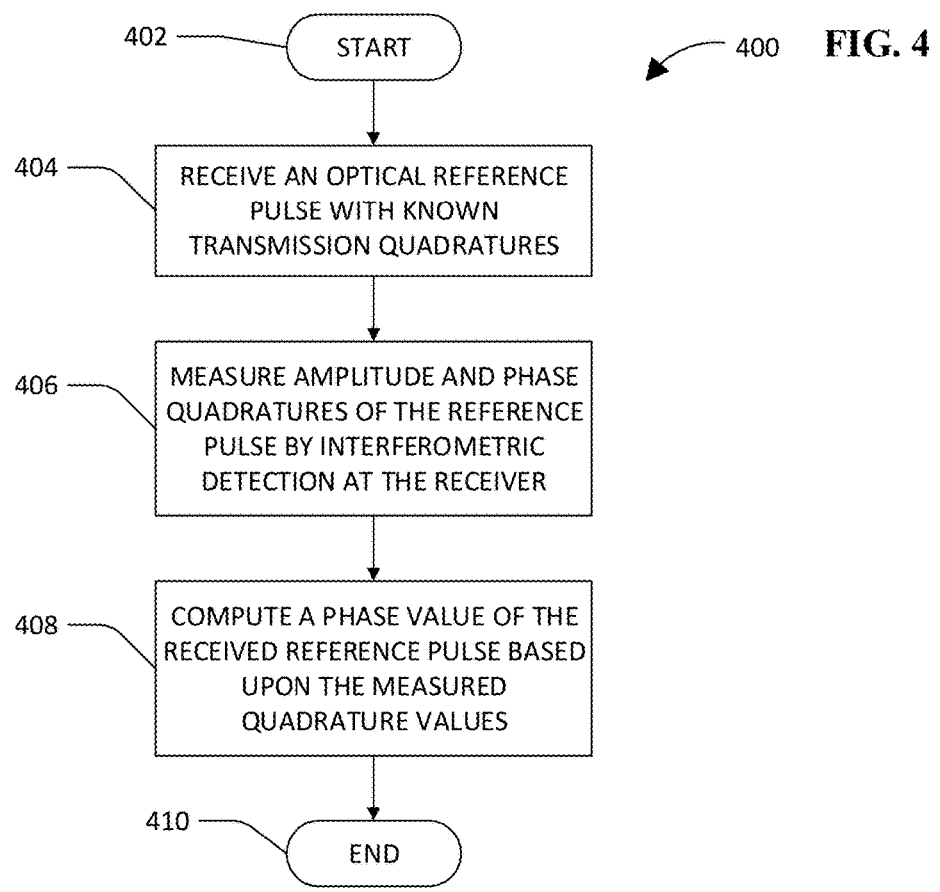
FIG. 4 is a flow diagram illustrating an exemplary methodology for identifying a phase offset between signals sent by a transmitter and received by a receiver.
Figure 5:
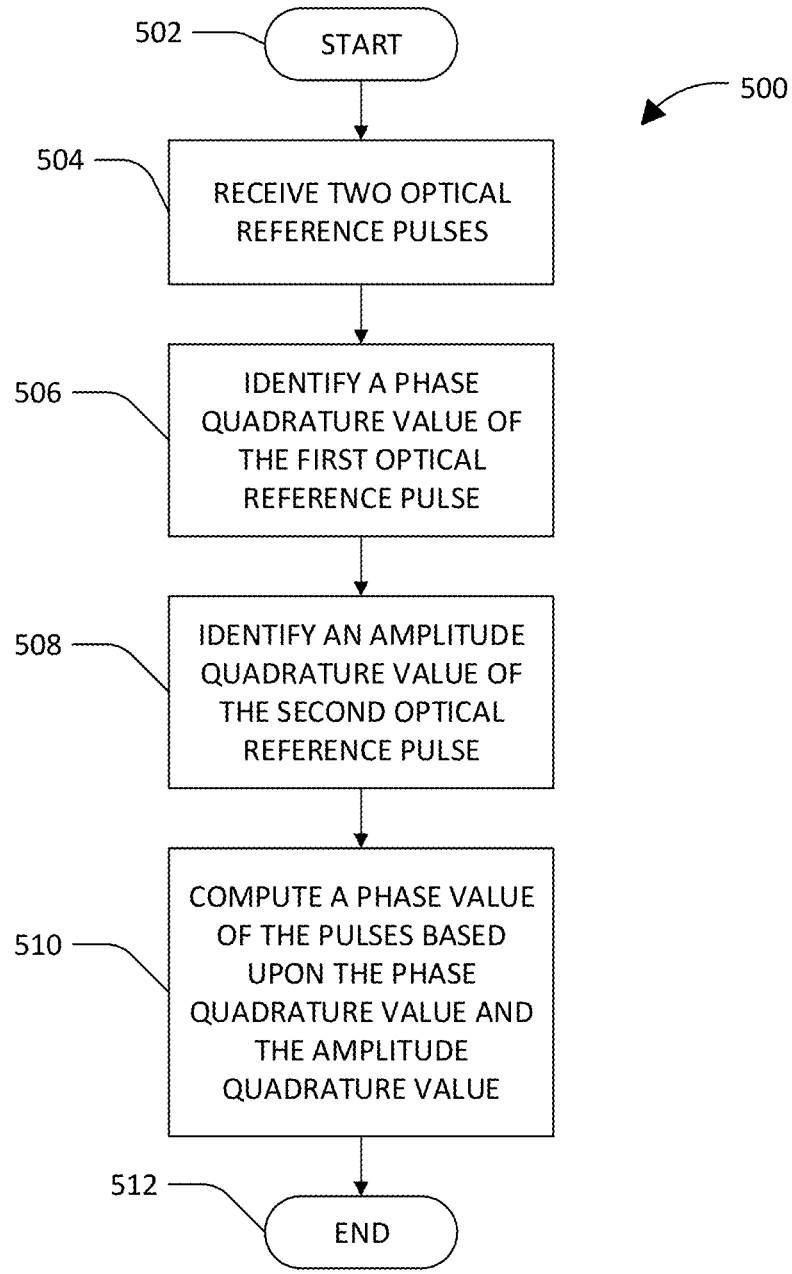
FIG. 5 is flow diagram illustrating an exemplary methodology for identifying a phase offset between signals sent by a transmitter and received by a receiver using homodyne detection to measure quadratures of the signals.

FIGS. 3-5 illustrate exemplary methodologies relating to performing CV-QKD without transmitting a transmitter's local oscillator signal on a transmission channel. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 3, a methodology 300 that facilitates CV-QKD without transmitting a transmitter's local oscillator signal is illustrated. The methodology 300 begins at 302, and at 304 a single-frequency optical signal used as a receiver's local oscillator is generated. In an example, the single-frequency optical signal is generated by a frequency-locked laser. At 306, a phase value of a first received optical pulse is identified based on interferometric detection between the single-frequency signal generated at 304 and the first optical pulse. The phase value of the first pulse identifies a phase offset between the transmitter and receiver caused by transmission channel noise, transmitter and receiver oscillator hardware, etc. By way of example, the phase value may be determined by performing interferometric detection and then calculating the phase angle based on a trigonometric ratio between amplitude and phase quadrature values of the first optical pulse measured by the interferometer and reference amplitude and phase quadrature values fixed by the transmitter. At 308, a second optical pulse that is encoded with some data is received, and the data is decoded by using the phase angle computed at 406 to correct for the phase offset in amplitude and phase quadrature measurements between the transmitter and the receiver.

Referring now to FIG. 4, an exemplary methodology 400 that facilitates identifying a phase value of an optical reference pulse is illustrated. The methodology 400 begins at 402, and at 404 an optical reference pulse with known transmission quadrature values is received. The quadrature values sent by a transmitter can be of any value provided that the value sent by the transmitter is known to a receiver. At 406, the amplitude and phase quadratures of the reference pulse are measured at the receiver by a process of interferometric detection, which may be either homodyne or heterodyne. The interfering signal used to perform the interferometric measurements of the reference pulse is a single-frequency signal from an oscillator that is local to the receiver. The phase referencing methods and systems described herein permit the oscillator local to the receiver to be used for homodyne and heterodyne detection at the receiver. This allows CV-QKD without transmitting the transmitter's oscillator signal over a transmission channel. In an example the oscillator may be a single-frequency laser that is one component of an integrated circuit comprising the receiver. At 408, a phase value of the received reference pulse relative to the transmitted reference pulse is computed. The computation is based upon the quadrature values measured at the receiver at 406. In an example, the computation is performed to identify the phase angle θ as described with respect to Equation 1 above. The phase angle is the phase offset between signals as transmitted by the transmitter and as received by the receiver. The phase angle varies over time in response to physical changes in the transmission channel, and the methodology 400 can be repeated in order to identify a phase of a new reference pulse. At 510, the methodology ends.

Referring now to FIG. 5, an exemplary methodology 500 that facilitates identifying a transmission phase offset angle using only homodyne detection is illustrated. The methodology 500 begins at 502 and at 504 two optical reference pulses are received, each having the same phase and amplitude quadrature values. At 506 a phase value of the first optical reference pulse is identified using homodyne measurement. Since homodyne measurement is only capable of measuring a single quadrature at a time, at 508 an amplitude quadrature value of the second optical reference pulse is identified by homodyne measurement. Using the phase quadrature measurement from the first optical reference pulse and the amplitude quadrature measurement from the second optical reference pulse, at 510 a phase value of the pulses is computed that identifies the phase difference between the transmitter and the receiver. At 512, the methodology 500 ends.

Figure 6:
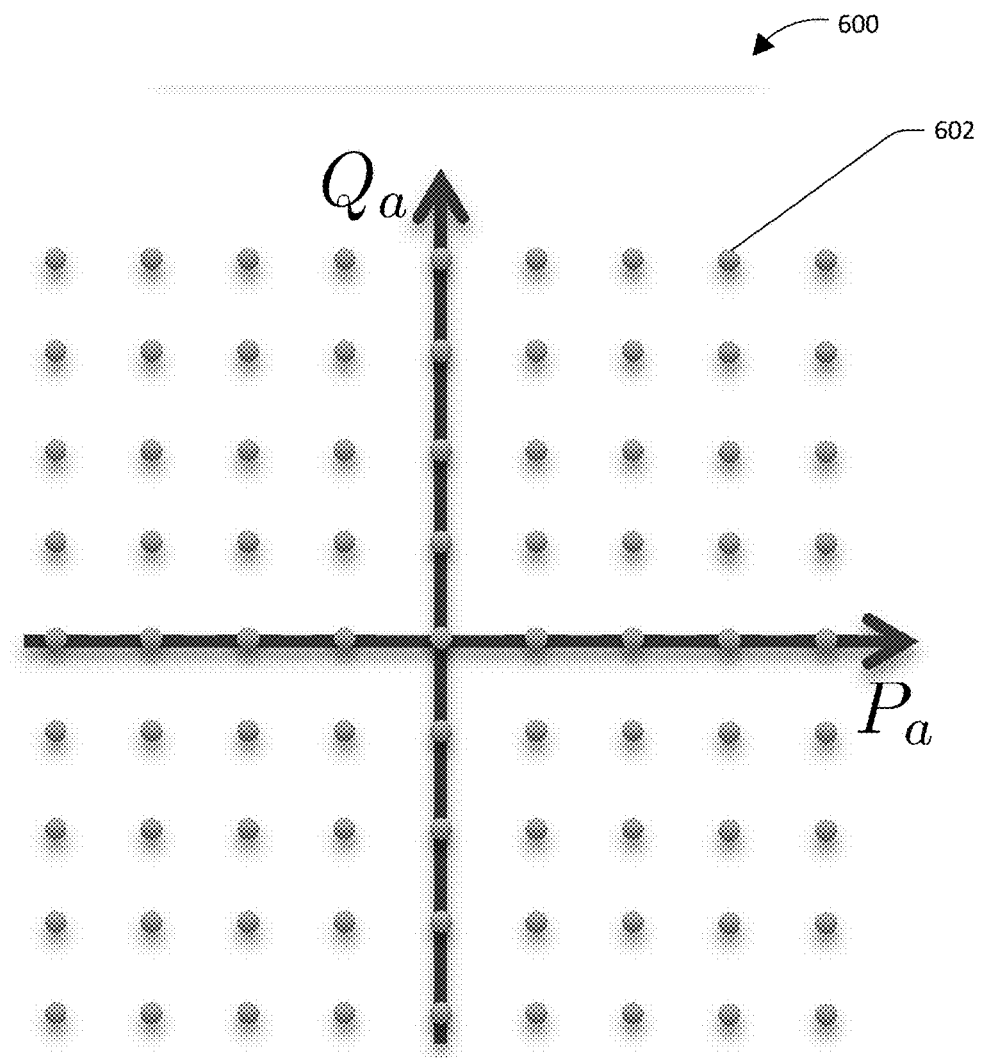
FIG. 6 is an exemplary illustration of dense coding of information on phase and amplitude quadratures of a continuous optical signal.

In addition to allowing CV-QKD without requiring the transmitter 102 to transmit its own local oscillator signal along the transmission path 106, real-time phase referencing as described in detail above increases precision of signal quadrature measurements sufficiently to allow dense coding on the phase and amplitude quadratures to enable high rate classical communication. Referring to FIG. 6, an exemplary illustration 600 of a quadrature encoding space is shown. The illustration 600 shows P-Q coordinate axes representing a space of possible amplitude and phase quadrature values for a pulse, and a plurality of dots (e.g., 602) representing possible encoding values on the amplitude and phase quadratures. In an example where P and Q values can be accurately measured to the nearest whole unit, a pulse to encode the binary value 0000 0011 can be modulated by the transmitter to have P-Q value (3, 0). Thus, the transmitter 102 can encode an 8-bit binary value on a single data pulse using a single pair of amplitude and phase quadrature measurements. Increasing the precision of amplitude and phase quadrature measurements permits the P-Q space to be more finely segmented, allowing more information to be encoded on a single pulse. Thus, in another example where P and Q values can be accurately measured to the nearest half, a pulse encoding the 16-bit binary value 0000 0001 0000 0011 could be modulated by the transmitter 102 to have P-Q value (1.5, 0.5).

Figure 7:
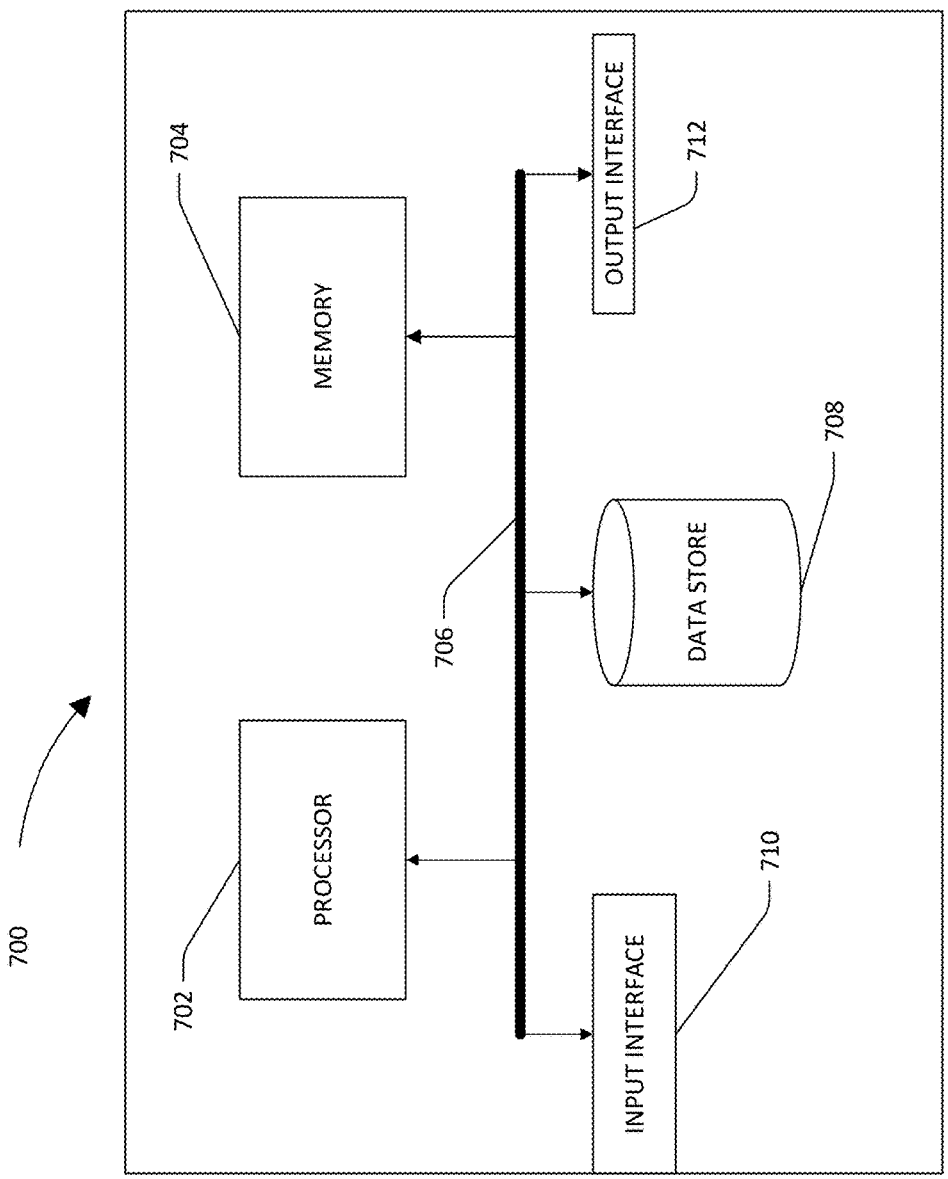
FIG. 7 is an exemplary computing system.

Referring now to FIG. 7, a high-level illustration of an exemplary computing device 700 that can be used in accordance with the systems and methodologies disclosed herein is illustrated. For instance, the computing device 700 may be used in a system that receives measurements from an interferometer and computes reference phase angles based on the measurements. By way of another example, the computing device 700 can be used in a system that receives quadrature measurements of encoded data pulses and computes compensated quadrature values based on an identified reference phase. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store amplitude and phase quadrature measurement values, computed reference phase angles, etc.

The computing device 700 additionally includes a data store 708 that is accessible by the processor 702 by way of the system bus 706. The data store 708 may include executable instructions, quadrature measurement values, reference phase angles, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system comprising:
    an integrated circuit configured to perform acts comprising:
        receiving a first optical pulse and a second optical pulse, the second optical pulse comprising encoded data;
        generating a single-frequency optical signal;
        identifying a phase value of the first optical pulse based upon interferometric detection between the single-frequency optical signal and the first optical pulse; and
        decoding the encoded data based upon the phase value of the first optical pulse.

2. The system of claim 1, wherein identifying the phase value of the first optical pulse comprises:
    measuring a phase quadrature value of the first optical pulse and an amplitude quadrature value of the first optical pulse by interferometric detection between the first optical pulse and the single-frequency optical signal; and
    computing the phase value of the first optical pulse based upon the phase quadrature value, the amplitude quadrature value, a reference phase quadrature value, and a reference amplitude quadrature value.

3. The system of claim 2, the integrated circuit further comprising a heterodyne detector configured to measure the phase and amplitude quadrature values of the first optical pulse.

4. The system of claim 1, wherein decoding the encoded data comprises:
    measuring a first phase quadrature value of the second optical pulse and a first amplitude quadrature value of the second optical pulse; and
    computing a corrected second phase quadrature value of the second optical pulse and a corrected second amplitude quadrature value of the second optical pulse based upon the phase value of the first optical pulse.

5. The system of claim 4, the integrated circuit further comprising a heterodyne detector configured to measure the phase and amplitude quadrature values of the second optical pulse.

6. The system of claim 1, wherein the first optical pulse has a first power and the second optical pulse has a second power, the first power being between ten and five hundred times larger than the second power.

7. The system of claim 6, wherein the first power is approximately 100 nw and the second power is approximately 10 nW.

8. The system of claim 1, wherein the integrated circuit comprises a laser configured to generate the single-frequency optical signal.

9. A method, comprising:
generating a single-frequency optical signal; and
responsive to receiving a first optical reference pulse at a first time and a second optical data pulse at a second time:
identifying a phase value of the first optical reference pulse based upon performing interferometric detection between the single-frequency optical signal and the first optical reference pulse; and
decoding data encoded on the second optical data pulse based upon the phase value of the first optical reference pulse.

10. The method according to claim 9, wherein identifying the phase value of the first optical reference pulse comprises:
identifying a phase quadrature value of the first optical reference pulse and an amplitude quadrature value of the first optical reference pulse based upon performing interferometric detection between the first optical reference pulse and the single-frequency optical signal; and
computing the phase value based upon a first offset between the phase quadrature value and a second known phase quadrature value and a second offset between the amplitude quadrature value and a second known amplitude quadrature value.

11. The method according to claim 9, wherein decoding data encoded on the second optical data pulse comprises:
measuring a phase quadrature value of the second optical data pulse and an amplitude quadrature value of the second optical data pulse; and
computing a corrected phase quadrature value and a corrected amplitude quadrature value of the second optical data pulse based upon the phase value of the first optical reference pulse.

12. The method according to claim 9, wherein the first optical reference pulse has a first power and the second optical data pulse has a second power, the first power being between ten and five hundred times larger than the second power.

13. The method according to claim 12, wherein the first power is approximately 100 nW and the second power is approximately 10 nW.

14. The method according to claim 9, further comprising receiving a third optical reference pulse at a third time, wherein identifying the phase value of the first optical reference pulse comprises:

identifying a phase quadrature value of the first optical reference pulse based upon performing homodyne detection between the first optical reference pulse and the single-frequency optical signal;
identifying an amplitude quadrature value of the third optical reference pulse based upon performing homodyne detection between the third optical reference pulse and the single-frequency optical signal; and
computing the phase value based upon the phase quadrature value and the amplitude quadrature value.

15. The method according to claim 9, wherein generating the single-frequency optical signal comprises using a laser to generate a single-frequency beam of light.

16. The method according to claim 9, wherein the data encoded on the second optical data pulse is encoded on a phase quadrature and an amplitude quadrature of the second optical data pulse.

17. The method according to claim 16, wherein the data comprises a 16-bit binary number.

18. A system comprising:
an optical transmitter that transmits optical pulses comprising:
a reference pulse; and
an encoded data pulse; and
an optical receiver that receives the reference pulse and the encoded data pulse and decodes the encoded data pulse, the optical receiver comprising:
an optical oscillator that generates a single-frequency optical signal; and
an integrated circuit configured to perform acts comprising:
performing homodyne or heterodyne detection between the single-frequency optical signal and the reference pulse to identify a first phase quadrature value of the reference pulse and a first amplitude quadrature value of the reference pulse;
performing homodyne or heterodyne detection between the single-frequency optical signal and the encoded data pulse to identify a second phase quadrature value of the encoded data pulse and a second amplitude quadrature value of the encoded data pulse;
identifying a phase value of the reference pulse based upon the first phase quadrature value and the first amplitude quadrature value; and
decoding the encoded data pulse based upon the identified phase value, the second phase quadrature value, and the second amplitude quadrature value.

19. The system of claim 18, wherein the optical oscillator is a frequency-locked laser.

20. The system of claim 18, wherein decoding the encoded data pulse comprises:
computing a third phase quadrature value and a third amplitude quadrature value based on compensating the second phase quadrature value and the second amplitude quadrature value for the identified phase value.

* * * * *